US008135378B2

(12) United States Patent
Yasrebi et al.

(10) Patent No.: US 8,135,378 B2
(45) Date of Patent: Mar. 13, 2012

(54) EMERGENCY RESPONSE SYSTEM

(75) Inventors: Mehrad Yasrebi, Austin, TX (US);
Bernard Ku, Austin, TX (US); Chaoxin Qiu, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1070 days.

(21) Appl. No.: 12/023,654

(22) Filed: Jan. 31, 2008

(65) Prior Publication Data

US 2009/0197563 A1    Aug. 6, 2009

(51) Int. Cl.
*H04M 11/04* (2006.01)

(52) U.S. Cl. .................. 455/404.1; 455/404.2; 455/418; 455/456.1; 455/456.2; 455/456.3; 455/456.5; 455/456.6; 455/457; 455/521

(58) Field of Classification Search ............... 455/404.1, 455/404.2, 418, 456.1–457, 521; 370/310.2, 370/312
See application file for complete search history.

(56) References Cited

U.S. PATENT DOCUMENTS

| | | | |
|---|---|---|---|
| 6,295,346 B1 * | 9/2001 | Markowitz et al. | 379/127.01 |
| 6,574,484 B1 * | 6/2003 | Carley | 455/521 |
| 2003/0174049 A1 * | 9/2003 | Beigel et al. | 340/10.42 |
| 2005/0210104 A1 * | 9/2005 | Torvinen | 709/205 |

FOREIGN PATENT DOCUMENTS

WO    2007120793 A3    10/2007

* cited by examiner

*Primary Examiner* — Steve D Agosta
(74) *Attorney, Agent, or Firm* — Woodcock Washburn LLP

(57) ABSTRACT

A system that incorporates teachings of the present disclosure may include, for example, a computer-readable storage medium including computer instructions for receiving an emergency request to assist a subscriber, retrieving presence information of each of a plurality of parties that serve as emergency contacts for the subscriber, selecting a communication identifier of at least one of the plurality of parties according to the presence information, and notifying the at least one party of the emergency request. Additional embodiments are disclosed.

20 Claims, 4 Drawing Sheets

100

EMERGENCY RESPONSE SYSTEM

FIELD OF THE DISCLOSURE

The present disclosure relates generally to communication systems and more specifically to an emergency response system.

BACKGROUND

With new developments in communication technology, consumers can now be reached while in transit with cellular phones, while at home or in the office by fixed line communications, by email, instant messaging, or with Short Message Service (SMS) or Multimedia Message Service (MMS) messages—just to mention a few. When there are a considerable number of communication options to reach a targeted party, it can be frustrating and undesirable for a calling party to have to exhaust each communication option. This can be especially true when an emergency situation arises in which prompt communication is desired.

DETAILED DESCRIPTION

In one embodiment of the present disclosure, a computer-readable storage medium operating in an emergency response system can have comprising computer instructions for recording a plurality of communication identifiers of one or more emergency contacts in an emergency response account of a subscriber, receiving an emergency request to assist the subscriber, retrieving presence information for the one or more emergency contacts, selecting at least one of the plurality of communication identifiers according to the presence information, and establishing communications with at least one of the one or more emergency contacts according to the at least one communication identifier.

In one embodiment of the present disclosure, a computer-readable storage medium can have computer instructions for receiving an emergency request to assist a subscriber, retrieving presence information of each of a plurality of parties that serve as emergency contacts for the subscriber, selecting a communication identifier of at least one of the plurality of parties according to the presence information, and notifying the at least one party of the emergency request.

In one embodiment of the present disclosure, a presence system can have a controller to monitor communication activity of one or more parties providing emergency support to a subscriber of an emergency response system, receiving from the emergency response system a request for presence information of at least one of the one or more parties providing emergency support to the subscriber, and submitting to the emergency response system the requested presence information.

Figure 1:
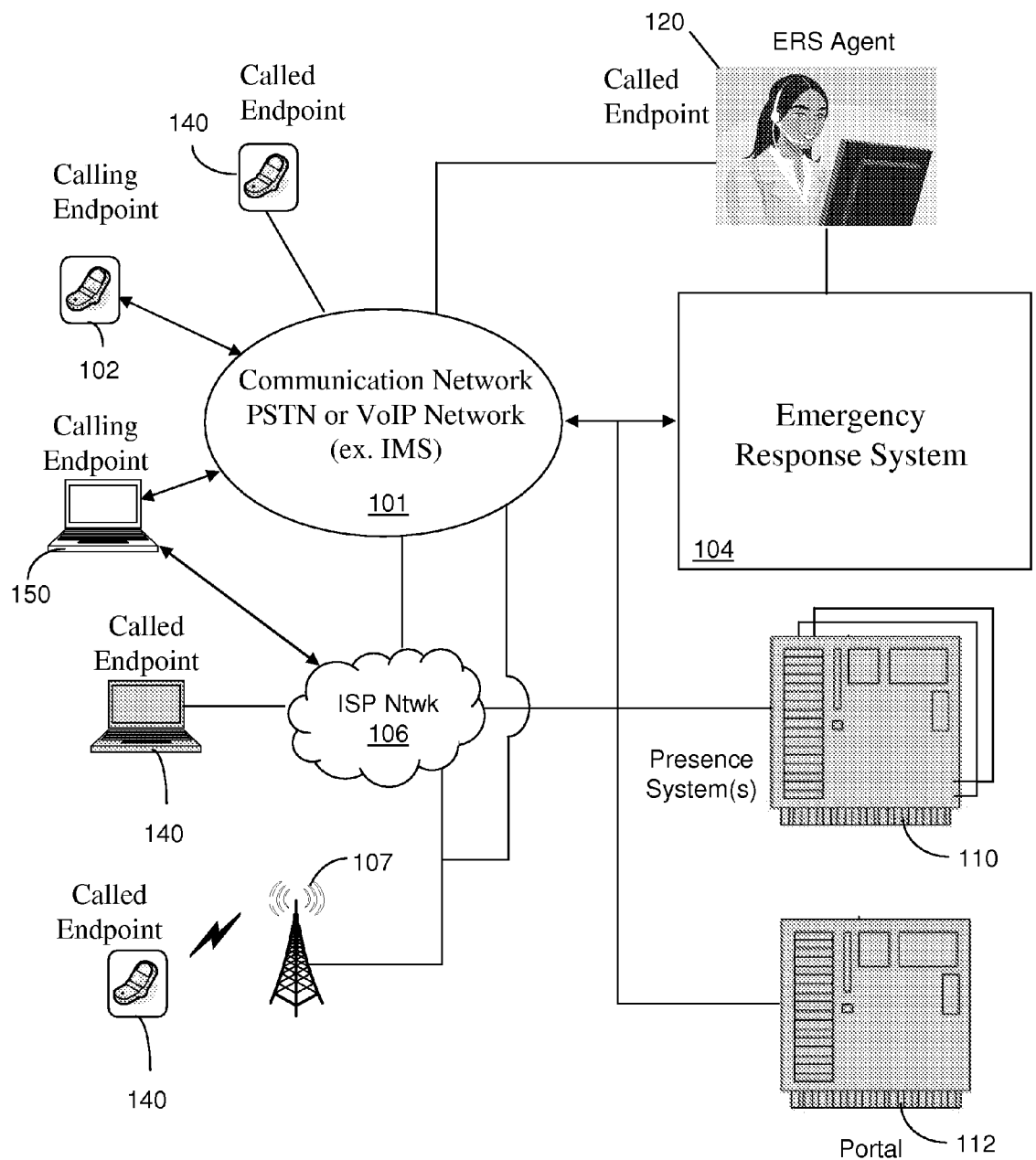
FIGS. 1-2 depict exemplary embodiments of a communication system.

FIG. 1 depicts an exemplary embodiment of a communication system 100. Communication 100 comprises calling end points 102 and 150 representative of for example a cell phone, cordless phone, wireline phone or computer coupled to an Internet Service Provider (ISP) network 106 and/or a communication network 101 such a Public Switched Telephone Network (PSTN), a Session Initiation Protocol (SIP)-based Voice over Internet Protocol (VoIP) network, or a hybrid network operating according to an IP Multimedia Subsystem (IMS) architecture. By way of the communication network 101 or ISP network 106, the calling end points 102, 150 can interface with an emergency response system (ERS) 104 to provide subscribers emergency response services. The calling end points 102, 150 can also achieve communications with called end points 140 by way of communication network 101.

The ERS 104 can utilize a database for storing emergency contact information in an emergency response account of each subscriber. The emergency contact information can include the names and addresses of a plurality of emergency contacts which can serve to support and/or assist the subscriber during an emergency condition. The emergency contact information can further include one or more communication identifiers for each emergency contact along with contact information of a corresponding presence system 110 that monitors communications activities of the emergency contact. The presence system 110 of each emergency contact can for example utilize common technology to monitor which of a number of communication devices of the emergency contact is in used by the emergency contact.

For instance, suppose the emergency contact has a cellular phone, a home phone, a home computer, an office phone, and an office computer. The presence system 110 can monitor communication activity of the ISP network 106 to determine whether the emergency contact is utilizing the office or home computer. The presence system 110 can also monitor whether the emergency contact is utilizing the cellular phone by monitoring its location. In this embodiment, the presence system 110 can monitor that the cellular phone is transitioning between cellular base stations 107, which can indicate that the emergency contact is in transit (traveling in a car, or train). Alternatively, or in combination, the presence system 110 can request location coordinates from a cellular phone having a Global Positioning System (GPS) receiver.

By detecting that the emergency contact is using a home computer, the presence system 110 can inform the ERS 104 that said contact can be potentially reached by email, instant text messaging, and/or webcam (or video) messaging through the home computer, and/or by a phone call to the home phone. By detecting that the emergency contact is using an office computer, the presence system 110 can inform the ERS 104 that said contact can be potentially reached by email, instant text messaging, and/or video messaging through the office computer, and/or by a phone call to the office phone. By detecting that the emergency contact is using a cellular phone and/or is in transit heading away from the contact's home or office, the presence system 110 can inform the ERS 104 that said contact can be potentially reached by Short Message Service (SMS) or Multimedia Message Service (MMS) messages, and/or a phone call directed to the cellular phone.

The ERS 104 can be coupled to a portal 112 that utilizes common web server technology to provide portal services to its subscribers over communication network 101, the ISP 106 and/or the cellular network 107. The portal 110 can be used by the subscribers to manage the emergency contacts and the contact information referred to above over a common web page interface. In this context, a subscriber can refer to a person whose information (biometric, emergency contact lists, conditions, etc.) are stored in the ERS 104. The services of the ERS 104 can be used by the subscriber, assistants or others, and can optionally require authentication for access. In an illustrative embodiment, students on a field trip can be registered subscribers of the ERS 104 and a teacher can be authorized by the students' parents to access the ERS by way of for example calling endpoint 150 to notify and/or establish contact with the parent(s) when an emergency arises for one or more of the students.

Figure 2:
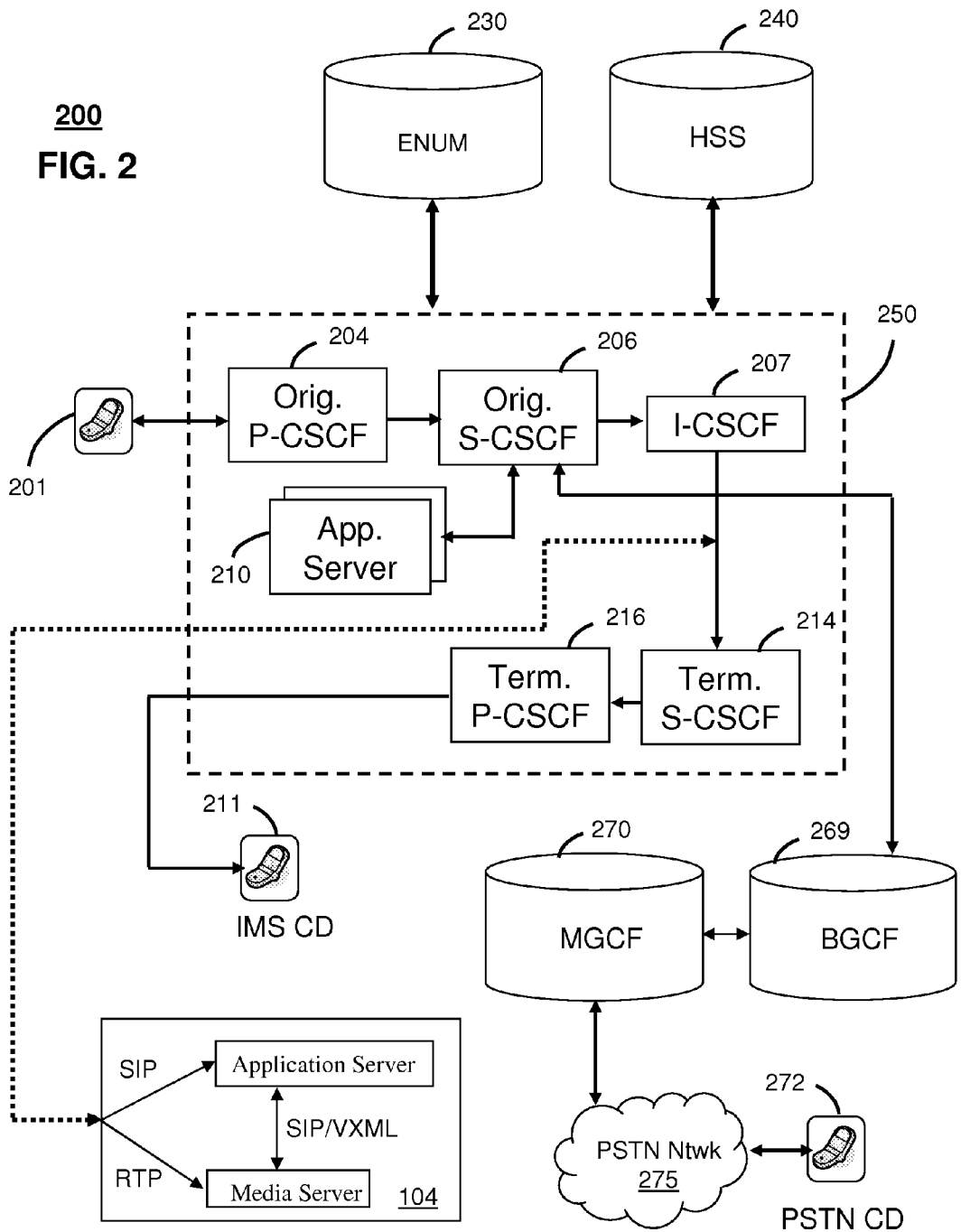

FIG. 2 depicts an exemplary embodiment of a communication system 200 employing an IMS network architecture. Communication system 200 can be overlaid or operably coupled with communication system 100 as another representative embodiment of communication system 100. The communication 200 can comprise a Home Subscriber Server (HSS) 240, a tElephone NUmber Mapping (ENUM) server 230, and common network elements of an IMS network 250. The IMS network 250 can be coupled to IMS communication devices such as an IMS-compliant phones 201, 211, and an IMS-compliant ERS 104 such as the one referred to earlier in FIG. 1. PSTN devices such as a PSTN phone 272 can be accessed by the IMS network 250 by way of a Media Gateway Control Function (MGCF) 270 coupled to a PSTN network 275.

The IMS communication devices 201, 211, and the PSTN phone 272 can be a representative embodiment of the calling end point 102 of FIG. 1, while the IMS network 250 can be a representative embodiment of the communication network 101 of FIG. 1.

To establish a communication session between phones, the IMS network 250 can utilize an originating Serving Call Session Control Function (S-CSCF) 206. The originating S-CSCF 206 can submit queries to the ENUM server 230 to translate an E.164 telephone number to a SIP Uniform Resource Identifier (URI) if the targeted communication device is IMS compliant. If the targeted communication device is a PSTN device such as reference 272, the ENUM server 230 will respond with an unsuccessful address resolution and the originating S-CSCF 206 will forward the call to the MGCF 270 by way of a Breakout Gateway Control Function (BGCF) 269). The MGCF 270 then connects the call through the PSTN network 275 using a common signaling means such as SS7.

In the instance where the ENUM server 230 returns a SIP URI, the SIP URI is used by an Interrogating CSCF (I-CSCF) 207 to submit a query to the HSS 240 to identify a terminating S-CSCF 214 associated with a targeted IMS communication device such as IMS CD 211. Once identified, the I-CSCF 207 can submit the SIP INVITE message to the terminating S-CSCF 214 which then identifies a terminating P-CSCF 216 associated with the targeted communication device. The P-CSCF 216 can then signal the communication device to establish communications. When the targeted IMS communication device is the ERS 104, the ENUM system 230 can be programmed to supply a SIP URI to the originating S-CSCF 206 which then establishes communications between the originating communication device and the ERS.

The ERS 104 can include an application server 104 supporting SIP message processing, and a Voice extensible Markup Language (VXML) for interacting with a calling party by way of synthesized speech, and speech and Dual-Tone Multi-Frequency (DTMF) detection serving collectively the function of an Interactive Voice Response (IVR) application. The ERS 104 can further include a common media server that processes real-time packet streams conforming to a Real-time Transport Protocol (RTP), and interacts with the application server using SIP and VXML.

In addition to the aforementioned network elements of the IMS network 250, there can also be a number of application servers 210 which can provide a variety of communication services to IMS subscribers. For example, the application server 210 can be used to perform originating treatment functions on the calling party number received by the S-CSCF 206. Originating treatment functions can include determining whether the calling party number has international calling services, and/or is requesting special telephony features (e.g., *72 forward calls, *73 cancel call forwarding, etc.).

Figure 3:
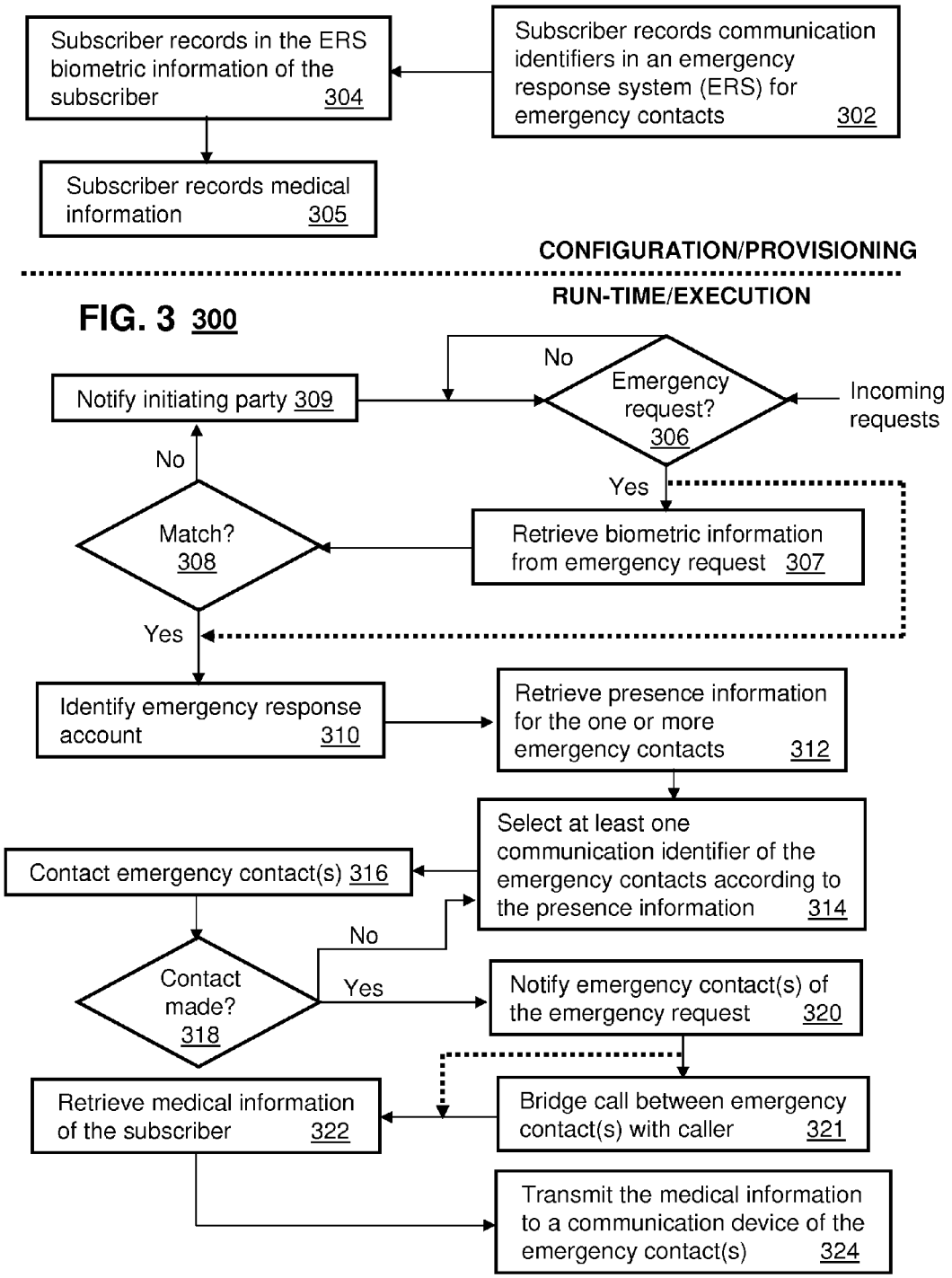
FIG. 3 depicts an exemplary method operating in portions of the communication system.

FIG. 3 depicts an exemplary method 300 operating in portions of the communication system 100. Method 300 can begin with step 302 where a subscriber establishes communications with an ERS 104 to record communication identifiers for emergency contacts. An emergency contact in the present context can mean an individual or organization that can provide the subscriber support during a moment of need. The emergency contact can therefore represent family, friends, the fire department, police, a support group, or any other person or entity that can respond to the subscribers needs.

It should be further noted that the term "emergency" should be interpreted broadly and is not limited just to situations requiring medical attention. What may be viewed as an emergency by the subscriber or by a party acting on behalf of the subscriber may not be viewed as an emergency by an emergency contact of the subscriber. Accordingly, the term "emergency" as used in the present disclosure should encompass any need of the subscriber whether or not the need justifies prompt or immediate attention.

Referring back to step 302, the subscriber can establish communications with the ERS 104 by way of the portal 112 using a common Internet browser, over a voice channel which activates the IVR application of the ERS, or by calling a service operator 120 of the ERS as shown in FIG. 1. With any one of these communication options the subscriber can identify herself utilizing a personal identification number (or PIN), user ID, and/or password to gain access to an emergency response account of the subscriber.

Once the subscriber has been authenticated, the subscriber can begin the process of recording communication identifiers for each emergency contact that can provide support to the subscriber. Each communication identifier can represent an E.164 number, a SIP URI, an instant messaging address, or an email address—among other things. The subscriber can also record contact information of presence system(s) 110 that monitor communication activities of corresponding emergency contact(s). The contact information of the presence system 110 can be a Uniform Resource Locator (URL) or static IP address with authentication information (e.g., PIN, user ID, password, etc.).

The subscriber can also define in the emergency response account a priority of communication between the emergency contacts. For example, fire rescue, police and family can identified as a first point of contact before friends. Priorities can be further refined by a severity of emergency. For example, medical emergencies can always result in the notification of fire rescue, police and certain family members, while emergencies of a non-medical nature can change the priority scheme to exclude fire rescue and the police from a priority list of family and friends.

In addition to the emergency contact information provided in step 302, the subscriber can record in step 304 biometric information of the subscriber. The biometric information can be one or more fingerprints, a retinal scan, DNA, pictures, serial number(s) or name(s) that could be used to identify any individual(s) or any other means of biometric information that can uniquely identify the subscriber. The biometric information can be retrieved with a common biometric reader (e.g., a fingerprint reader), encrypted or otherwise encoded, and transmitted to the ERS 104 over a secure communication link (e.g., a secure socket layer or SSL). The biometric information can be recorded in a database of the ERS 104 and associated in step 304 with the emergency response account of the subscriber. The biometric information can therefore serve as a rapid means of authentication and identification of the emergency response account of the subscriber.

To assist an emergency contact, the subscriber can also record in step 305 medical information of the subscriber. The medical information can include among other things a description of preexisting conditions of the subscriber (e.g., type 2 diabetic, high blood pressure, heart condition, etc.), prescriptions, allergies, subscriber's primary physician, medical insurance information, preferred hospital, family contact information, etc. Steps 302, 304 and 305 can collectively operate as a background setup process independently operated from steps 306-324 as indicated by the dashed line. That is, steps 302-305 represent configuration or provisioning steps taken by the subscriber, while steps 306-324 represent run-time execution/utilization steps.

Once the provisioning information supplied in steps 302, 304 and 305 has been recorded, the ERS 104 can proceed to step 306 where it monitors incoming emergency requests originating from for example calling end point 102 or 150 operably coupled to communication network 101 or ISP 106. An emergency request can be initiated by the subscriber or a party acting on behalf of the subscriber using any number of communication devices. For example, the communication device can be a common medical alerting device carried by the subscriber which can be triggered by the subscriber manually (e.g., subscriber depresses an emergency request button), by a speech command (e.g., subscriber yells "Help"), a fall (e.g., an attitude detector in the communication device of the subscriber detects that the subscriber is on the floor), or a medical condition that is monitored by a device of the subscriber (e.g., a pulse monitor, a heart monitor, a breathing monitor, etc.).

Generally speaking, the communication device of the subscriber or party assisting the subscriber can represent a landline, Voice over Internet Protocol (VoIP) or cellular communications device such as calling endpoint 102 communicatively coupled to the ERS 104 by way of network 101. In another illustrative embodiment, the communication device of the subscriber or party assisting the subscriber can represent a computer such as calling endpoint 150 coupled to network 101, the ISP network 106, or a combination thereof as shown in FIG. 1. In this embodiment, a subscriber or assistant can for example initiate communications with the ERS 104 using a common Internet browser over the ISP network 106. If the subscriber or assistant notifies the ERS 104 by way of the browser that an emergency has arisen, the ERS can respond with a request to the calling end point 150 to initiate a soft phone application (if available) to establish voice communications with the ERS over a VoIP channel of network 101. If a soft phone application is not available, the calling party can be asked by the ERS over the browser interface to use a calling endpoint 102 if available. For Internet-capable cell phones, the foregoing descriptions can refer to a single device that integrates the functions of calling endpoints 102 and 150.

Biometric data can be transmitted over data channels, while voice-only or any multimedia communications can be taking place on the same or other channels. In an illustrative embodiment, the calling endpoint 150, which can be a computer, can be used by the subscriber or assistant to identify the subscriber by pictures, numbers (such as serial numbers), names, other data, or combinations thereof entered or selected by the subscriber or assistant by way of a browser that presents a graphical user interface (GUI) with selectable lists, entry fields, or other suitable entry mechanisms.

With this in mind, the subscriber or assistant acting as a calling party can submit to the ERS 104 over an Internet connection a text and/or video message (using for example a webcam coupled to the calling endpoint 102 or 150). The message can be representative of an emergency request that describes the nature of the emergency to the emergency contacts. The ERS 104 can record the emergency request message and convey it to communication devices of the emergency contacts by any suitable communication means (e.g., fax, email, SMS messages, MMS messages, etc.). The emergency request message can also include a caller ID and/or a desired callback number defined by the subscriber or assistant, which each emergency contact can utilize to promptly reach the subscriber and/or assistant.

The emergency request transmitted by calling end point 102 or 150 can also include biometric information of the subscriber which the ERS 104 can retrieve in step 307 to perform a rapid identification of the subscriber. The biometric information can be prerecorded in the communication device of the subscriber, can be selected from a computer interface at the calling endpoint 150 that is presented by portal 112, or can be supplied to a biometric reader embedded or attached as an accessory to the communication device. In step 308 the ERS 104 can compare the received biometric information with the recorded biometric information supplied by the subscriber in provisioning step 304. If no match is found, the ERS 104 can notify in step 309 the party that initiated the emergency request of the mismatch and request a resubmission of the emergency request with biometric data in step 306. The portal 112 can provide an interactive user interface front end to the services of ERS 104 using the calling endpoint 150 over ISP network 106. The connection(s) between the portal 112 and the ERS 104 can be implemented with common communication technologies such as, but not limited to, a local area network, processing units such as routers, ISP network 106, or combinations thereof.

If a match is found, the ERS 104 can proceed to step 310 where it identifies the emergency response account of the subscriber. Additional communication identifiers of any emergency contact can be stored in one or more databases that are available to ERS 104 such as but not limited to an IMS ENUM database such as reference 230 of FIG. 2. In step 312, the ERS 104 can communicate with one or more presence systems 110 to retrieve presence information of one or more emergency contacts listed in the emergency response account of the subscriber. From the presence information the ERS 104 can as described above determine which communication device available to each emergency contact is likely to achieve communications on a first attempt. From this determination, the ERS 104 can select in step 314 at least one communication identifier for each of the one or more emergency contacts. The ERS 104 can select more than one communication identifier and more than one emergency contact (e.g., fire rescue and closest relatives) if a severity level of the emergency described in the emergency request is severe (e.g., heart attack or fall). If the severity level is low, the ERS 104 can instead select certain emergency contacts while excluding others as previously described in step 302.

Once the communication identifiers have been selected, the ERS 104 can begin to contact in step 316 the emergency contacts at a number of possible called end points 140 (e.g., computer, cell phone, home phone, office phone, pager, etc.). If in step 318 the ERS 104 detects that contact is not achieved with one or more of the emergency contacts, the ERS can return to step 314 where it selects other communication identifiers using the presence information retrieved in step 312 as a guide. As soon as an emergency contact answers a call initiated by the ERS 104, the ERS can notify the contact in step 320 of the nature of the emergency request (e.g., subscriber has fallen, subscriber is experiencing a heart attack, subscriber is experiencing insulin shock, please call 111-222-3333 to reach subscriber or assistant, etc.). The notification can be a text message, a synthesized speech message provided over a voice channel, or other suitable forms of communication formats available between the ERS 104 and the communication device of the emergency contact(s) in question. Information supplied to any emergency contact can be pre-configured in the ERS 104 and/or collected by ERS from sources such as portal 112, an interactive voice response system, or combinations thereof.

Furthermore, for voice and/or multimedia communications, as soon as the emergency contact is reached, the ERS 104 can offer the emergency contact the option to bridge the call with the subscriber and/or assistant. As additional emergency contacts are reached by the iterative process of steps 314-318, the ERS 104 can continue to bridge the call between the subscriber and/or assistant and the emergency contacts. This can be accomplished by common conferencing techniques.

In step 322, the ERS 104 can also retrieve the medical information of the subscriber, and transmit it in step 324 to the emergency contacts. The information can be transmitted as a text message with graphics if available. Optional steps 322-324 can be useful to emergency personnel such as fire rescue paramedics to treat the subscriber's situation based on the nature of the emergency and preexisting medical conditions outlined in the medical history.

Upon reviewing the embodiments disclosed, it would be evident to an artisan with ordinary skill in the art that said embodiments can be modified, reduced, or enhanced without departing from the scope and spirit of the claims described below. For example, method 300 can be adapted so that steps 304, 305, 307, 308 and 309 are bypassed in situations where biometric information is not required or available. In this embodiment, the emergency response account of the subscriber can be identified in the emergency request by identification data included in the request and/or by a caller ID of the communication device of the subscriber. Additionally, method 300 can be adapted to retrieve authentication data (e.g., PIN, password) from the emergency request to authenticate the subscriber or a party assisting the subscriber.

Other suitable modifications can be applied to the present disclosure without departing from the scope of the claims below. Accordingly, the reader is directed to the claims for a fuller understanding of the breadth and scope of the present disclosure.

Figure 4:
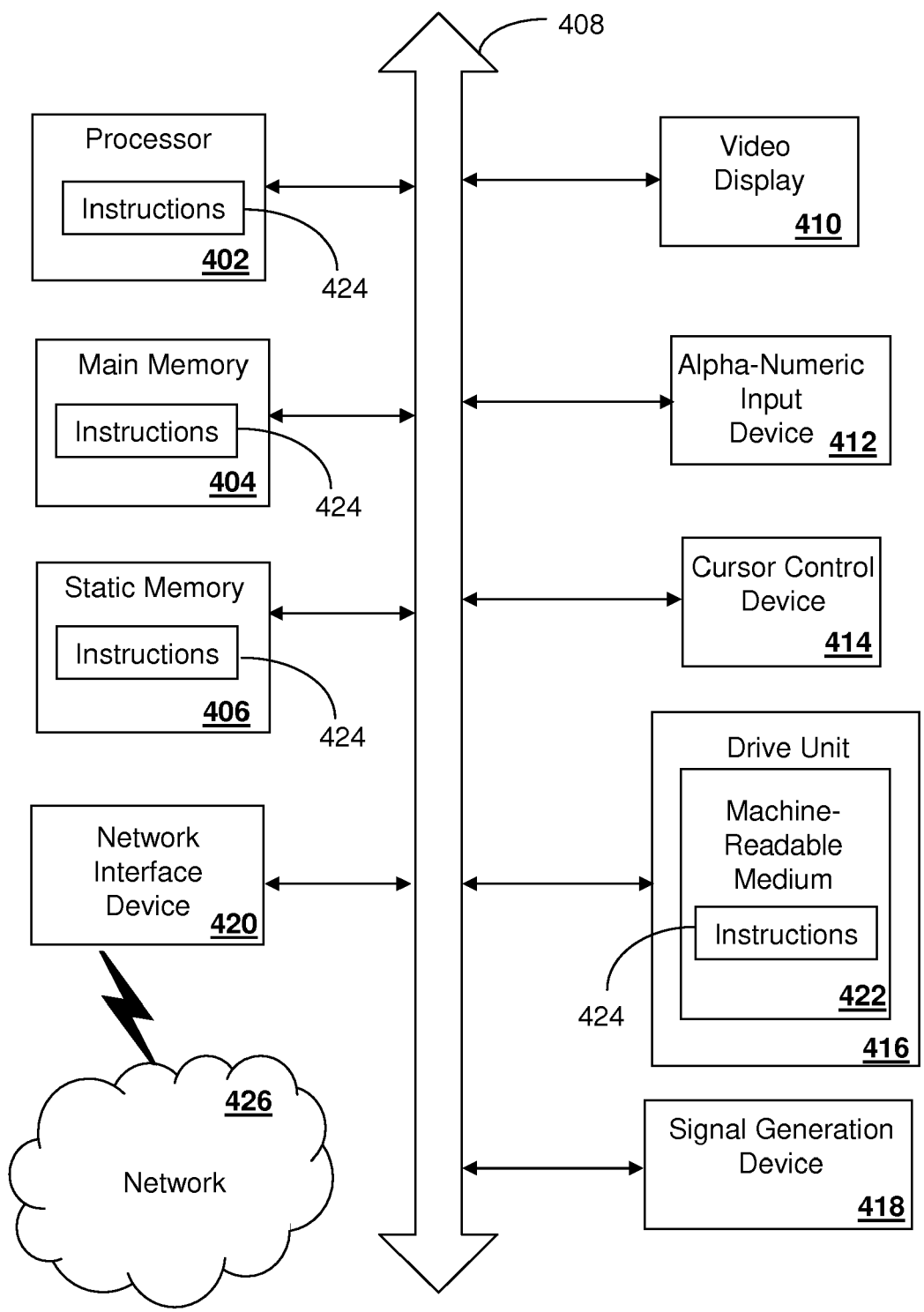
FIG. 4 depicts an exemplary diagrammatic representation of a machine in the form of a computer system within which a set of instructions, when executed, may cause the machine to perform any plurality of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible computer-readable storage medium, the computer-readable storage medium not being a transient signal, the computer-readable storage medium comprising computer instructions for:
    recording a plurality of communication identifiers of one or more emergency contacts in an emergency response account of a subscriber, wherein each communication identifier can be used to establish communication with a select one of the emergency contacts;
    recording medical information in the emergency response account of the subscriber;
    recording biometric information of the subscriber;
    associating the biometric information with the emergency response account of the subscriber;
    receiving an emergency request to assist the subscriber;
    receiving biometric information with the emergency request;
    comparing the received biometric information with the recorded biometric information;
    identifying the emergency response account of the subscriber responsive to detecting a match between the received biometric information and the recorded biometric information;
    retrieving the medical information from the emergency response account of the subscriber responsive to detecting the match between the received biometric information and the recorded biometric information;
    retrieving presence information for the one or more emergency contacts, presence information being indicative of a respective communication mode by which the one or more emergency contacts can be reached;
    selecting at least one of the plurality of communication identifiers according to the presence information;
    establishing communications, via a communication mode indicated by the presence information, with at least one of the one or more emergency contacts according to the at least one communication identifier; and
    transmitting the medical information to the at least one of the one or more emergency contacts.

2. The storage medium of claim 1, wherein the medical information includes medical information about the subscriber and family contact information, and wherein the biometric information comprises one among a fingerprint, and a retinal scan.

3. The storage medium of claim 1, wherein the emergency request identifies the emergency response account of the subscriber, wherein the emergency request is received from a communication device of one among the subscriber and a party assisting the subscriber, and wherein the communication device corresponds to one among a portable telephone, a fixed line telephone, and a medical emergency alert device that detects medical emergencies associated with the subscriber.

4. The storage medium of claim 1, wherein the emergency response system operates in at least one among a circuit-switched communication network, and a packet-switched communication network.

5. The storage medium of claim 4, wherein the circuit-switched communication network corresponds to a Public Switched Telephone Network (PSTN), and wherein the packet-switched communication network corresponds to an Internet Protocol Multimedia Subsystem (IMS) supporting Voice over IP (VoIP) and PSTN communications.

6. The storage medium of claim 1, wherein the plurality of communication identifiers correspond to at least one among an E.164 number, a Session Initiation Protocol Uniform Resource Identifier (SIP URI), an instant messaging address, and an email address.

7. A tangible computer-readable storage medium, the computer-readable storage medium not being a transient signal, the computer-readable storage medium comprising computer instructions for:
   recording medical information in an emergency response account of a subscriber;
   recording, for each of a plurality of parties that server as emergency contacts for the subscriber, in an emergency response account of the subscriber one or more communication identifiers and contact information of a corresponding presence system;
   receiving an emergency request to assist the subscriber;
   retrieving presence information of each of a plurality of parties that serve as emergency contacts for the subscriber;
   selecting one or more communication identifiers of at least one of the plurality of parties according to the presence information; and
   notifying the at least one party of the emergency request;
   retrieving the medical information from the emergency response account of the subscriber responsive to detecting a match between the received biometric information and recorded biometric information; and
   transmitting the medical information to the one of the one or more parties providing the subscriber emergency support.

8. The storage medium of claim 7, wherein the presence system monitors communication activities of a party, and generates presence information to determine a likelihood of communicating with the party with each one or more communication identifiers.

9. The storage medium of claim 7, comprising computer instructions for:
   recording biometric information of the subscriber;
   associating the biometric information with the emergency response account of the subscriber;
   receiving biometric information in the emergency request;
   comparing the received biometric information with the recorded biometric information; and
   identifying the emergency response account of the subscriber responsive to detecting a match between the received biometric information and the recorded biometric information.

10. The storage medium of claim 9, wherein the medical information includes medical information about the subscriber and family contact information.

11. The storage medium of claim 7, wherein the emergency request is received from a communication device of one among the subscriber and a party assisting the subscriber, and wherein the communication device corresponds to one among a portable telephone, a fixed line telephone, and a medical emergency alert device that detects medical emergencies associated with the subscriber.

12. The storage medium of claim 7, wherein the computer-readable storage medium operates as an emergency response system in at least as one among a circuits witched communication network, and a packet-switched communication network.

13. The storage medium of claim 12, wherein the circuit-switched communication network corresponds to a Public Switched Telephone Network (PSTN), and wherein the packet-switched communication network corresponds to an Internet Protocol Multimedia Subsystem (IMS) supporting Voice over IP (VoIP) and PSTN communications.

14. The storage medium of claim 7, wherein the plurality of communication identifiers correspond to at least one among an E.164 number, a Session Initiation Protocol Uniform Resource Identifier (SIP URI), an instant messaging address, and an email address.

15. The storage medium of claim 7, wherein the emergency request comprises a description of an emergency occurring with the subscriber, and wherein the storage medium comprises computer instructions for selecting the one or more communication identifiers of the at least one party based on a severity of said description.

16. The storage medium of claim 7, comprising computer instructions for selecting the at least one party according to a priority of communication established for the plurality of parties serving as emergency contacts for the subscriber.

17. The storage medium of claim 7, comprising computer instructions for:
   storing the one or more communication identifiers of each of the plurality of parties in an emergency response account of the subscriber; and
   retrieving from the emergency request an identification of the emergency response account.

18. The storage medium of claim 17, comprising computer instructions for:
   retrieving authentication data from the emergency request; and
   authenticating at least one among the subscriber or a party assisting the subscriber according to said authentication data.

19. A presence server configure to:
   record medical information in an emergency response account of a subscriber;
   record, for each of a plurality of parties that server as emergency contacts for the subscriber, in an emergency response account of the subscriber one or more communication identifiers and contact information of a corresponding presence system;
   receive an emergency request to assist the subscriber;
   retrieve presence information of each of a plurality of parties that serve as emergency contacts for the subscriber;
   select one or more communication identifiers of at least one of the plurality of parties according to the presence information; and
   notify the at least one party of the emergency request;
   retrieve the medical information from the emergency response account of the subscriber responsive to detecting a match between the received biometric information and recorded biometric information; and
   transmit the medical information to the one of the one or more parties providing the subscriber emergency support.

20. The presence server of claim 19, wherein the presence information comprises a likelihood of responsive communications for each of a plurality of communication identifiers of the one or more parties.

* * * * *